(12) United States Patent
Dai et al.

(10) Patent No.: US 11,733,135 B2
(45) Date of Patent: Aug. 22, 2023

(54) INTEGRAL TENSION TEST SYSTEM FOR LARGE-TONNAGE BASALT FIBER ANCHOR CABLE AND TEST METHOD

(71) Applicant: Wuhan Center, China Geological Survey (Central South China Innovation Center for Geosciences), Wuhan (CN)

(72) Inventors: Zhenwei Dai, Wuhan (CN); Shengtao Zhou, Wuhan (CN); Xiaolin Fu, Wuhan (CN); Yanjun Zhang, Wuhan (CN); Anle Zhang, Wuhan (CN); Runqing Ye, Wuhan (CN); Jinjun Guo, Wuhan (CN); Zhigang Du, Wuhan (CN)

(73) Assignee: Wuhan Center, China Geological Survey (Central South China Innovation Center for Geosciences), Wuhan (CN)

( * ) Notice: Subject to any disclaimer, the term of this patent is extended or adjusted under 35 U.S.C. 154(b) by 170 days.

(21) Appl. No.: 17/522,934

(22) Filed: Nov. 10, 2021

(65) Prior Publication Data
US 2023/0064403 A1 Mar. 2, 2023

(30) Foreign Application Priority Data
Aug. 31, 2021 (CN) .......................... 202111010865.2

(51) Int. Cl.
*G01N 3/08* (2006.01)
*G01N 3/32* (2006.01)
*G01N 3/02* (2006.01)

(52) U.S. Cl.
CPC ....... *G01N 3/08* (2013.01); *G01N 2203/0055* (2013.01); *G01N 2203/023* (2013.01);
(Continued)

(58) Field of Classification Search
CPC ............ G01N 17/00; G01N 3/02; G01N 3/10; G01N 3/08; G01N 3/12; G01B 11/165;
(Continued)

(56) References Cited

U.S. PATENT DOCUMENTS

| 4,473,915 | A * | 10/1984 | Finsterwalder | E04C 5/125 14/18 |
| 8,780,339 | B2 * | 7/2014 | Udd | A61B 50/10 356/73.1 |

(Continued)

*Primary Examiner* — Brandi N Hopkins
(74) *Attorney, Agent, or Firm* — True Shepherd LLC; Andrew C. Cheng

(57) ABSTRACT

An integral tension test system for a large-tonnage basalt fiber anchor cable includes: a plurality of basalt fiber anchoring bars each comprising a basalt fiber reinforced plastic (BFRP) bundle, a steel strand, a first and a second steel casing pipes, the BFRP bundle including a plurality of BFRPs, and a grating array temperature, stress and vibration sensing optical cables bonded in the BFRP; a vibration table and a reaction frame arranged thereon, wherein the first steel casing pipe of the basalt fiber anchoring bar is located in the reaction frame, the steel strand penetrates one end of the reaction frame to be connected to a center hole jack, and the second steel casing pipe of each basalt fiber anchor cable is located outside the reaction frame to be anchored; and a data acquisition module connected to all of the grating array temperature, stress and vibration sensing optical cables.

9 Claims, 8 Drawing Sheets

(52) U.S. Cl.
CPC ............... *G01N 2203/0224* (2013.01); *G01N 2203/0246* (2013.01)

(58) Field of Classification Search
CPC .. G01B 11/18; G01L 5/00; G01L 5/04; G01L 1/246; G01L 5/101; E02B 3/04; E02D 33/00; E02D 17/20; E04G 21/121; E04C 3/291
See application file for complete search history.

(56) References Cited

U.S. PATENT DOCUMENTS

| | | | |
|---|---|---|---|
| 9,347,271 B2 | 5/2016 | Zediker et al. | |
| 9,725,906 B2 | 8/2017 | Brock | |
| 9,846,105 B2 * | 12/2017 | Wu | G01M 5/0091 |
| 2016/0084733 A1 * | 3/2016 | Wu | G01M 11/083 29/458 |

* cited by examiner

INTEGRAL TENSION TEST SYSTEM FOR LARGE-TONNAGE BASALT FIBER ANCHOR CABLE AND TEST METHOD

CROSS-REFERENCE TO RELATED APPLICATIONS

This application claims priority to Chinese Patent Application No. 202111010865.2 with a filing date of Aug. 31, 2021. The content of the aforementioned application, including any intervening amendments thereto, is incorporated herein by reference.

TECHNICAL FIELD

The present disclosure relates to the technical field of prevention and control over geological disasters, and particularly relates to an integral tension test system for a large-tonnage basalt fiber anchor cable and a test method.

BACKGROUND

Since a hydro-fluctuation belt in a reservoir area is often affected by the drying-wetting cycle, traditional steel anchor cables are prone to corrosion when used for anchoring in reinforcement of the hydro-fluctuation belt of a canyon bank slope of the reservoir area. In addition, the health condition of an anchoring structure is difficult to monitor due to long-standing cyclical fluctuation in water level, posing a safety risk to the bank slope of the reservoir. Currently, a large number of novel fiber-reinforced composite anchor rods (cables) have already emerged and provide a new idea for reinforcement of the hydro-fluctuation belt of the bank slope of the reservoir. The basalt fiber reinforced plastic (BFRP) has a tensile strength larger than 1.1 GPa and density merely ⅓-¼ that of steel bars, and has good corrosion resistance, high stability, low raw material cost, and the like. The BFRP thus become an environment-friendly light material for manufacturing the anchor cable and is expected to be applied to the field of rock mass reinforcement of the bank slope of the reservoir.

Currently, existing researches mostly focus on the interface mechanical features of BFRPs and concrete materials, but a BFRP anchoring structure which can be practically applied to field anchoring is still being developed. A large-tonnage basalt fiber anchoring structure which can be applied to the bank slope of the reservoir has been developed by Wuhan Geological Survey Center of China Geological Survey for the first time. In order to meet the test requirement of the anchoring capacity of the large-tonnage basalt fiber anchor cable, an integral tension test system for the large-tonnage basalt fiber anchor cable and a tension method which can meet the test requirement in a laboratory are necessarily to be designed.

SUMMARY

In view of this, to meet a test requirement of anchoring capacity of a large-tonnage basalt fiber anchor cable, the present disclosure provides an integral tension test system for a large-tonnage basalt fiber anchor cable. The system includes:

a plurality of basalt fiber anchoring bars, where each of the plurality of basalt fiber anchoring bars includes a basalt fiber reinforced plastic (BFRP) bundle, a steel strand, a first steel casing pipe with two ends bonded to one end of the BFRP bundle and the steel strand respectively, and a second steel casing pipe bonded to the other end of the BFRP bundle, the BFRP bundle and the steel strand are centered in the first steel casing pipe, the BFRP bundle includes a plurality of BFRPs which are bound and combined, and a grating array temperature sensing optical cable, a grating array stress sensing optical cable and a grating array vibration sensing optical cable are bonded in each of the BFRPs;

a vibration table and a reaction frame arranged on the vibration table, where the reaction frame is of a closed structure, all the basalt fiber anchoring bars penetrate the reaction frame, the first steel casing pipe of each of the plurality of basalt fiber anchoring bars is located in the reaction frame, the steel strand penetrates one end of the reaction frame and a center hole jack, and the second steel casing pipe of each of the plurality of basalt fiber anchoring bars is located outside the reaction frame to be anchored; and a data acquisition module connected to all grating array temperature sensing optical cables, all grating array stress sensing optical cables and all grating array vibration sensing optical cables, so as to acquire temperature, stress and vibration of each of the BFRPs.

Further, the integral tension test system for a large-tonnage basalt fiber anchor cable further includes a high-low temperature alternating changer for heating and cooling an interior of the reaction frame, where a plurality of temperature sensors are further arranged in the reaction frame, and all temperature sensors are connected to the data acquisition module.

Further, the integral tension test system for a large-tonnage basalt fiber anchor cable further includes a humidifying and dehumidifying machine in communication with the reaction frame, where a plurality of humidity sensors are further arranged in the reaction frame, and all humidity sensors are connected to the data acquisition module.

Further, a first base plate, a pressure sensor, a second base plate, a first anchor ring, a limiting plate and a second anchor ring are sequentially arranged on an outer side of one end, close to the first steel casing pipe, of the reaction frame, the center hole jack is arranged between the limiting plate and the second anchor ring, the steel strand penetrates the first base plate, the pressure sensor, the second base plate, the first anchor ring, the limiting plate, the center hole jack and the second anchor ring, and the pressure sensor and an oil pump of the center hole jack are connected to the data acquisition module.

Further, a plurality of anchor holes are provided in both the first anchor ring and the second anchor ring, each steel strand penetrates one anchor hole, two conical clips surrounding the steel strand are arranged in the anchor hole, and the steel strand is clamped by the two clips.

Further, a stay wire type displacement meter is arranged between the center hole jack and one end, close to the first steel casing pipe, of the reaction frame, a stay wire of the stay wire type displacement meter is parallel to an axis of the center hole jack, two ends of the reaction frame are provided with another stay wire type displacement meter, stay wires of the two stay wire type displacement meters are parallel to each other, and the two stay wire type displacement meters are connected to the data acquisition module.

Further, a pressure bearing plate and a pressure bearing anchor ring are sequentially arranged on an outer side of one end, close to the second steel casing pipe, of the reaction frame, a plurality of through holes are provided in the pressure bearing plate, a plurality of stepped through holes are provided in the pressure bearing anchor ring, each second steel casing pipe is inserted into one stepped through hole and abuts against the stepped through hole, and the BFRP bundle penetrates the through hole and the stepped through hole.

Further, surfaces of portions of bonding the BFRP to the first steel casing pipe and the second steel casing pipe are subjected to sand blasting treatment, a surface of a portion of bonding the steel strand to the first steel casing pipe are subjected to nicking treatment, and internal threads are arranged on inner walls of the first steel casing pipe and the second steel casing pipe.

In addition, on the basis of the integral tension test system for a large-tonnage basalt fiber anchor cable, the embodiment of the present disclosure provides a test method for the integral tension test system for a large-tonnage basalt fiber anchor cable. The test method mainly includes:

adjusting temperature and humidity in the reaction frame;

applying vibration to the reaction frame by the vibration table; and tensioning the basalt fiber anchoring bars one by one by a small-tonnage center hole jack, applying, after the basalt fiber anchoring bars are tensioned to a pre-tensioning design value, tension to an entire basalt fiber anchor cable by the center hole jack, and meanwhile, acquiring temperature, stress and vibration in each BFRP of all the basalt fiber anchoring bars by the data acquisition module until the entire large-tonnage basalt fiber anchor cable is damaged.

The technical solution provided by the present disclosure has the beneficial effects:

The integral tension test system for a large-tonnage basalt fiber anchor cable and the test method for a laboratory test may effectively simulate an environment at temperature and humidity of a bank slope of a reservoir and seismic load and effectively measure maximum anchoring force of the large-tonnage basalt fiber anchor cable in different environments, may also be used for creep tests of a large-tonnage basalt fiber anchor cable structure, and may accurately measure ultimate load of the large-tonnage pressure type basalt fiber anchor cable in an environment at specific temperature and humidity. Stress and vibration response features in the basalt fiber anchor cable under coupling action of specific temperature, humidity and seismic load are automatically monitored.

The present disclosure relates to the integral tension test system for a large-tonnage basalt fiber anchor cable and the test method, where the integral tension test system for a large-tonnage basalt fiber anchor cable may be directly applied to laboratory tests and has comprehensive test means, a good test effect and a high automation degree, and a corresponding test method is further provided, which may reliably evaluate anchoring capacity of the large-tonnage basalt fiber anchor cable.

In the figures: 1—BFRP bundle, 101—BFRP, 101a—grating array temperature sensing optical cable, 101b—grating array stress sensing optical cable, 101c—grating array vibration sensing optical cable, 102—cable tie, 2—first steel casing pipe, 3—second steel casing pipe, 4—steel strand, 5—vibration table, 6—reaction frame, 7—high-low temperature alternating changer, 701—low-temperature condensation pipe, 702—heating pipe, 8—heat insulation gasket, 9—pressure bearing plate, 10—pressure bearing anchor ring, 10a—stepped through hole, 11—center hole jack, 12—first base plate, 13—pressure sensor, 14—second base plate, 15—first anchor ring, 15a—anchor hole, 16—limiting plate, 17—second anchor ring, 18—stay wire type displacement meter, 19—temperature sensor, 20—humidity sensor, 21—dehumidifying and humidifying machine, 22—steel adhesive, 23—clip, 24—FC/PC patch cable, 25—fiber grating demodulator, 26—automatic data acquisition system, 27—data transmission system, and 28—computer.

DETAILED DESCRIPTION OF THE EMBODIMENTS

In order to make the objectives, technical solutions and advantages of the present disclosure clearer, the implementations of the present disclosure are described in more detail below with reference to the accompanying drawings.

Figure 1:
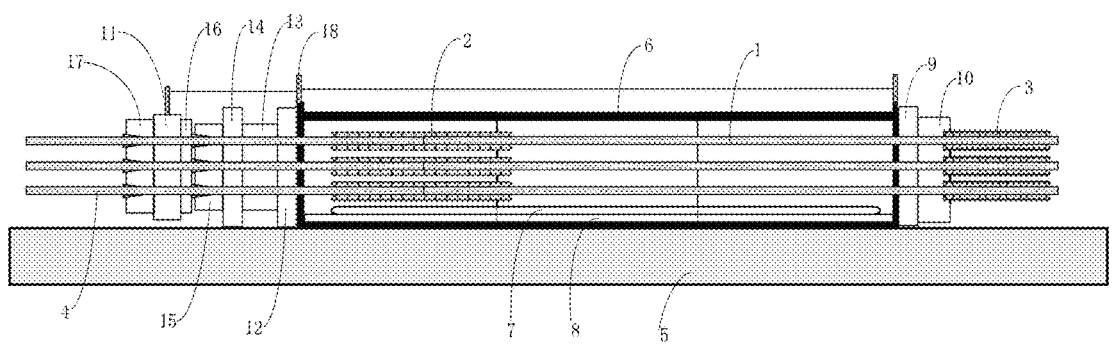
FIG. 1 is a sectional view of a front view of an integral tension test system for a large-tonnage basalt fiber anchor cable in the present disclosure.
Figure 2:
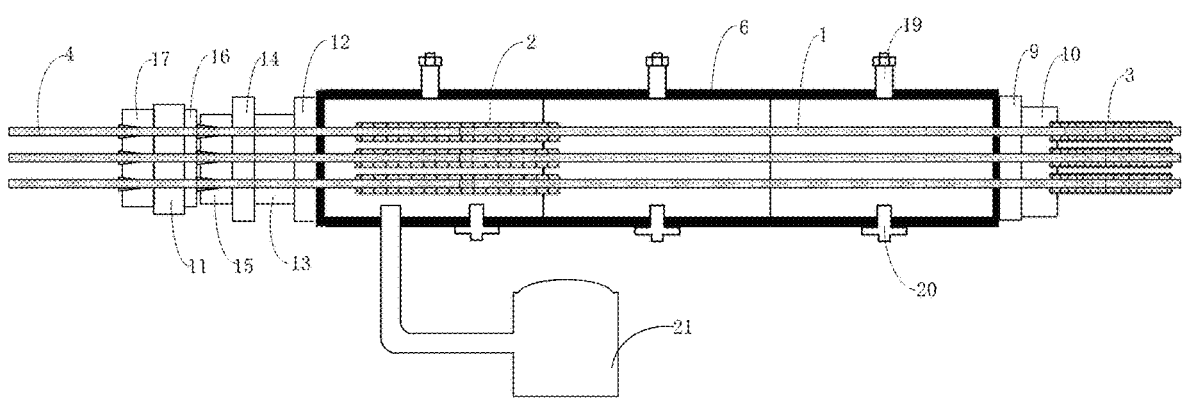
FIG. 2 is a sectional view of a top view of the integral tension test system for a large-tonnage basalt fiber anchor cable in the present disclosure.

With reference to FIGS. 1 and 2, the embodiment of the present disclosure provides an integral tension test system for a large-tonnage basalt fiber anchor cable and a test method.

The embodiment of the present disclosure provides the integral tension test system for a large-tonnage basalt fiber anchor cable. The integral tension test system specifically includes a plurality of basalt fiber anchoring bars, a vibration table 5, a reaction frame 6 arranged on the vibration table 5, and a data acquisition module.

Each of the plurality of basalt fiber anchoring bars includes a basalt fiber reinforced plastic (BFRP) bundle 1, a steel strand 4, a first steel casing pipe 2 with two ends bonded to one end of the BFRP bundle 1 and the steel strand 4 separately, and a second steel casing pipe 3 bonded to the other end of the BFRP bundle 1, the BFRP bundle 1 and the steel strand 4 are inserted into the first steel casing pipe 2 and centered in the first steel casing pipe 2.

Figure 3:
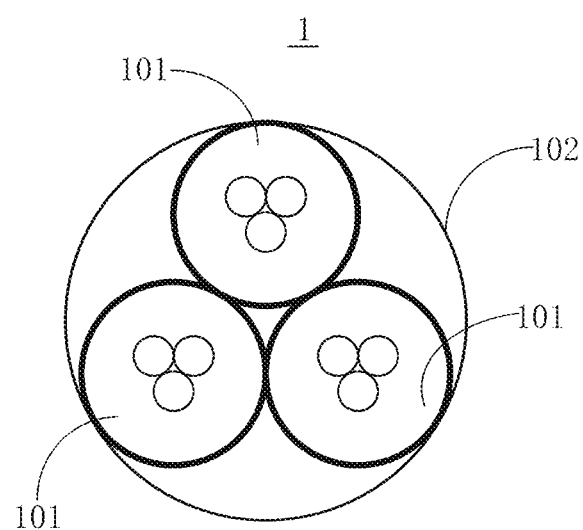
FIG. 3 is a schematic sectional view of a basalt fiber reinforced plastic (BFRP) bundle 1 in FIG. 1.
Figure 4:
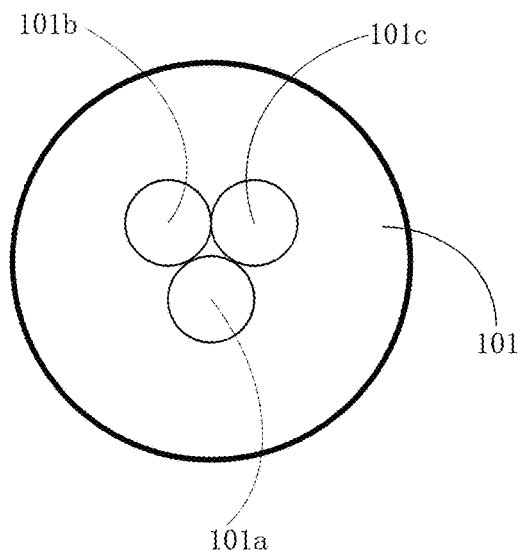
FIG. 4 is a schematic sectional view of a BFRP 101 in FIG. 3.

With reference to FIGS. 3 and 4, the BFRP bundle 1 includes a plurality of BFRPs 101 which are bound and combined, and a grating array temperature sensing optical cable 101a, a grating array stress sensing optical cable 101b and a grating array vibration sensing optical cable 101c are bonded in each of the BFRPs 101. When a basalt fiber is drawn and bonded, the grating array temperature sensing optical cable 101a, the grating array stress sensing optical cable 101b and the grating array vibration sensing optical cable 101c are bonded in each of the single BFRPs 101, so as to guarantee that the grating array temperature sensing optical cable 101a, the grating array stress sensing optical cable 101b and the grating array vibration sensing optical cable 101c may effectively measure temperature, stress and vibration change conditions in the BFRP 101. Two ends of the plurality of BFRPs 101 are aligned, and then the BFRPs 101 are bound and tightened by a cable tie 102 to form the single BFRP bundle 1, so as to avoid intertwining between different BFRP bundles 1.

Figure 5:
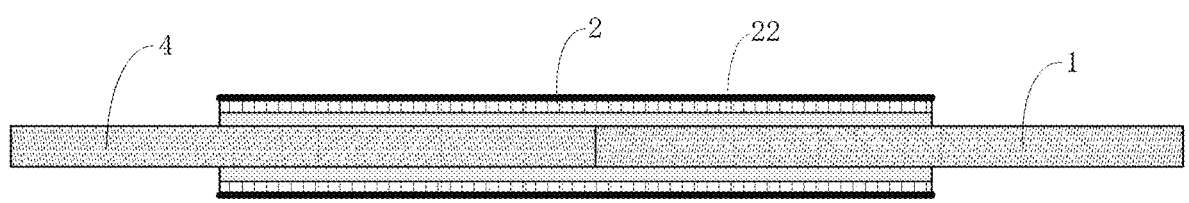
FIG. 5 is a schematic diagram of connection in a first steel casing pipe 2 in FIG. 1.
Figure 8:
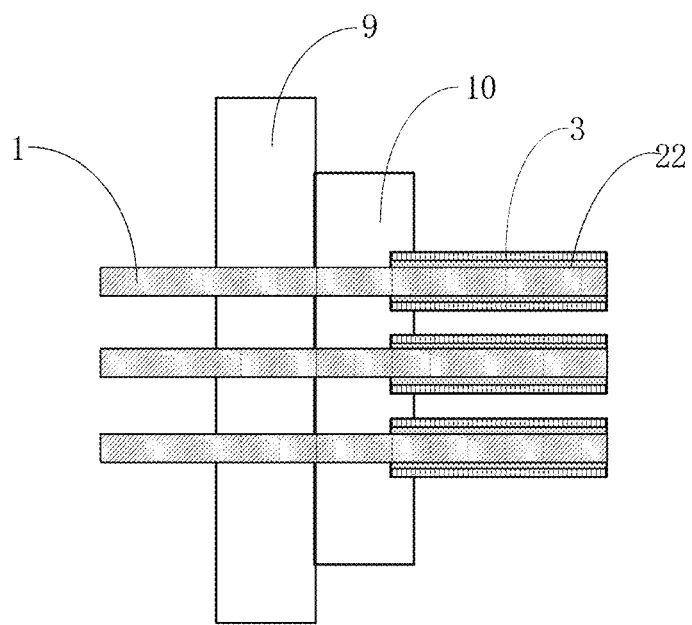
FIG. 8 is a schematic diagram of the BFRP bundle 1 and a pressure bearing anchor ring 10 of FIG. 1.

With reference to FIGS. 5 and 8, two ends of the BFRP bundle 1 are bonded to the first steel casing pipe 2 and the second steel casing pipe 3 by steel adhesive 22. In order to guarantee a desirable bonding effect, surfaces of portions of bonding each of the BFRP bundles 1 to the first steel casing pipe 2 and the second steel casing pipe 3 are subjected to sand blasting treatment, a surface of a portion of bonding the steel strand 4 to the first steel casing pipe 2 are subjected to nicking treatment, and internal threads are arranged on inner walls of the first steel casing pipe 2 and the second steel casing pipe 3. Bonding lengths of portions of bonding the steel strand 4 and the BFRP bundle 1 to the first steel casing pipe 2 respectively account for half of a total length of the first steel casing pipe 2, such that strength of connecting portions of the first steel casing pipe 2 and the second steel casing pipe 3 may be effectively guaranteed, thereby guaranteeing that the steel strand 4 and the BFRP bundle 1 do not slip from the first steel casing pipe 2 and the second steel casing pipe 3 when the basalt fiber anchor cable is tensioned.

The reaction frame 6 is arranged on the vibration table 5, and the vibration table 5 applies seismic waves to the reaction frame 6 to simulate an earthquake environment. A periphery of the reaction frame 6 is integrally sealed, and it is guaranteed that a closed space is formed in the reaction frame 6. A high-low temperature alternating changer 7 for heating and cooling an interior of the reaction frame 6 is further arranged below the reaction frame 6. A heat insulation gasket 8 is further arranged at a bottom of the reaction frame, and the high-low temperature alternating changer 7 is arranged on the heat insulation gasket 8 to prevent temperature in the reaction frame 6 from being affected by heat transfer of the vibration table 5.

Figure 10:
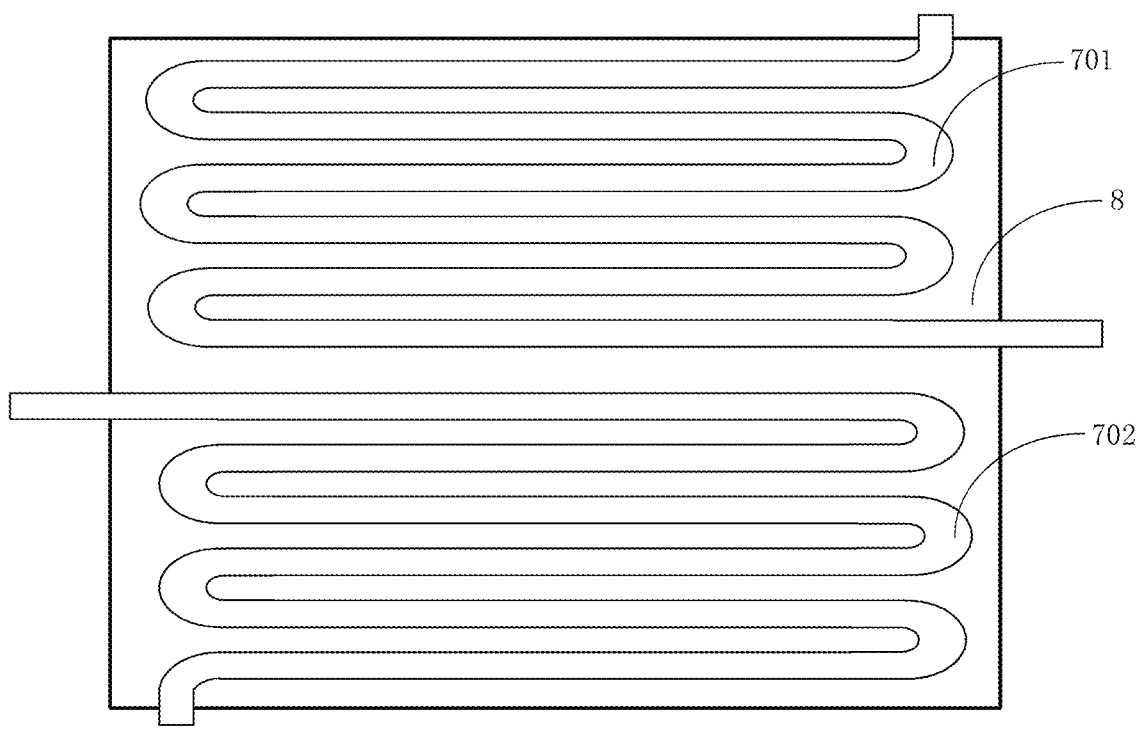
FIG. 10 is a schematic diagram of a high-low temperature alternating changer 7 in FIG. 1.

There is a wide selection of a high-low temperature alternating changer 7. With reference to FIG. 10, the high-low temperature alternating changer 7 consists of a heating pipe 702 and a low-temperature condensation pipe 701, and the heating pipe 702 and the low-temperature condensation pipe 701 are mounted on the heat insulation gasket 8 in parallel. Two ends of the heating pipe 702 and two ends of the low-temperature condensation pipe 701 penetrate out of the reaction frame 6 and are connected to a heater and a condenser outside the reaction frame 6 respectively, so as to perform temperature changing treatment on an internal environment of the reaction frame 6.

With reference to FIG. 2, a humidifying and dehumidifying machine 21 is further arranged outside the reaction frame 6, and the humidifying and dehumidifying machine 21 penetrates a side wall of the reaction frame 6 by a dehumidifying and humidifying pipe to extend into the reaction frame 6 so as to be in communication with the interior of the reaction frame 6, thereby humidifying and dehumidifying the interior of the reaction frame 6. The high-low temperature alternating changer 7 and the humidifying and dehumidifying machine 21 simulate a field environment with temperature and humidity where the BFRPs actually work.

A plurality of temperature sensors 19 and a plurality of humidity sensors 20 are also arranged in the reaction frame 6. The plurality of temperature sensors 19 are arranged on one side wall, in a length direction of the basalt fiber anchoring bar bundle 1, in the reaction frame 6, the plurality of humidity sensors 20 are arranged on the other side wall parallel to the side wall, and the temperature sensors 19 and the humidity sensors 20 are respectively used for measuring temperature and humidity conditions of different positions in the reaction frame 6 and evaluating whether temperature and humidity of all positions in the reaction frame 6 are uniformly distributed.

Comparing and analyzing temperature collected from the plurality of temperature sensors 19 mounted on the side wall of the reaction frame 6 and from the grating array temperature sensing optical cables 101a arranged in the BFRPs 101 may guarantee that the temperature in the entire anchor cable test system is identical to that in the BFRPs, such that the test system may be controlled to keep constant temperature, and a stress error caused by temperature gradient is removed.

The plurality of humidity sensors 20 mounted on the side wall of the reaction frame 6 may measure humidity of the environments, at different positions, in the reaction frame 6, so as to control the test system to keep constant humidity. Under the condition that a creep test for a large-tonnage basalt fiber anchor cable is carried out, a humidity condition may be changed, so as to analyze long-time stress loss of the basalt fiber anchor cable under different humidity conditions.

All the basalt fiber anchoring bars are mounted on the reaction frame 6. Specifically, all the basalt fiber anchoring bars penetrate the reaction frame 6, the first steel casing pipe 2 of each of the plurality of basalt fiber anchoring bars is located in the reaction frame 6, the steel strand 4 penetrates one end of the reaction frame 6 to a center hole jack 11, and the second steel casing pipe 3 of each of the plurality of basalt fiber anchoring bars is located outside the reaction frame 6 to be anchored.

Herein, a first base plate 12, a pressure sensor 13, a second base plate 14, a first anchor ring 15, a limiting plate 16 and a second anchor ring 17 are sequentially arranged on an outer side of one end, close to the first steel casing pipe 2, of the reaction frame 6, the center hole jack 11 is arranged between the limiting plate 16 and the second anchor ring 17, the pressure sensor 13 is clamped and fixed by the first base plate 12 and the second base plate 14, the steel strand 4 penetrates the first base plate 12, the pressure sensor 13, the second base plate 14, the first anchor ring 15, the limiting plate 16, the center hole jack 11 and the second anchor ring 17, and the pressure sensor 13 sleeves the steel strand 4 and used for monitoring a load value applied by the center hole jack 11. The center hole jack 11 is a large-tonnage center hole jack.

Figure 6:
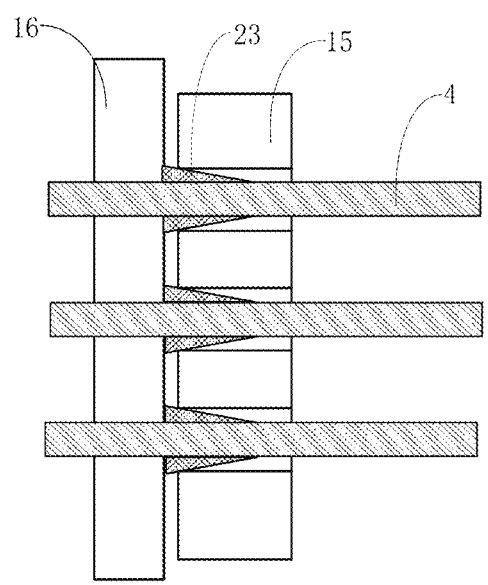
FIG. 6 is a schematic diagram of a first anchor ring 15 and a steel strand 4 in FIG. 1.
Figure 7:
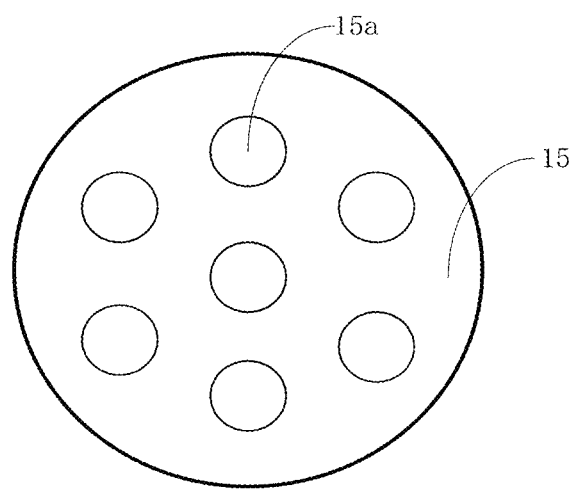
FIG. 7 is a schematic diagram of the first anchor ring 15 in FIG. 6.

Further, with reference to FIGS. 6 and 7, the first anchor ring 15 and the second anchor ring 17 have an identical structure and are both provided with a plurality of anchor holes 15a, each steel strand 4 penetrates one anchor hole 15a, two conical clips 23 surrounding the steel strand are arranged in the anchor hole 15a, and the steel strand 4 is clamped by the clips 23. A stay wire type displacement meter 18 is arranged between the center hole jack 11 and one end, close to the first steel casing pipe 2, of the reaction frame 6, a stay wire of the stay wire type displacement meter 18 is parallel to an axis of the center hole jack 11, and the stay wire type displacement meter 18 is used for monitoring relative elongation of the anchor cable in a tension test process of the basalt fiber anchor cable. Two ends of the reaction frame 6 are provided with another stay wire type displacement meter 18 for monitoring compression deformation of the reaction frame 6, and stay wires of the two stay wire type displacement meters 18 are parallel. A difference between the relative elongation of the anchor cable and the compression deformation of the reaction frame 6 monitored by the stay wire type displacement meters 18 is absolute elongation of the basalt fiber anchor cable.

Figure 9:
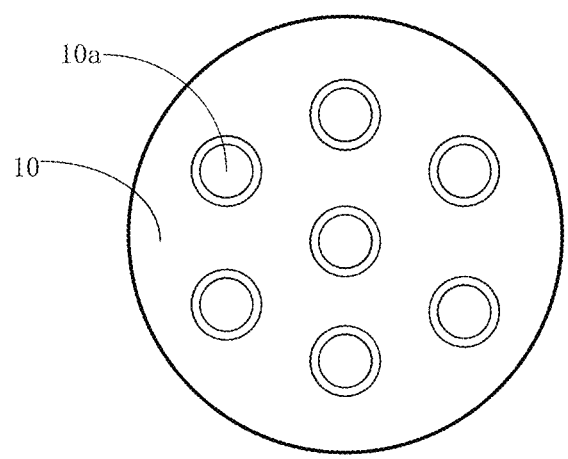
FIG. 9 is a schematic diagram of the pressure bearing anchor ring 10 in FIG. 8.

With reference to FIGS. 8 and 9, a pressure bearing anchor ring 10 is arranged on an outer side of one end, close to the second steel casing pipe 3, of the reaction frame 6, a plurality of stepped through holes 10a are provided in the pressure bearing anchor ring 10, each second steel casing pipe 3 is inserted into one stepped through hole 10a and abuts against the stepped through hole 10a, and the BFRP bundle 1 penetrates the stepped through hole 10a. Moreover, a pressure bearing plate 9 is further arranged between the pressure bearing anchor ring 10 and an end of the reaction frame 6, the pressure bearing plate 9 makes contact with the end of the reaction frame 6 in an attached manner, a plurality of through holes are provided in the pressure bearing plate 9, the BFRP bundles 1 penetrate the through holes separately, and the pressure bearing anchor ring 10 abuts against the pressure bearing plate 9.

Figure 11:
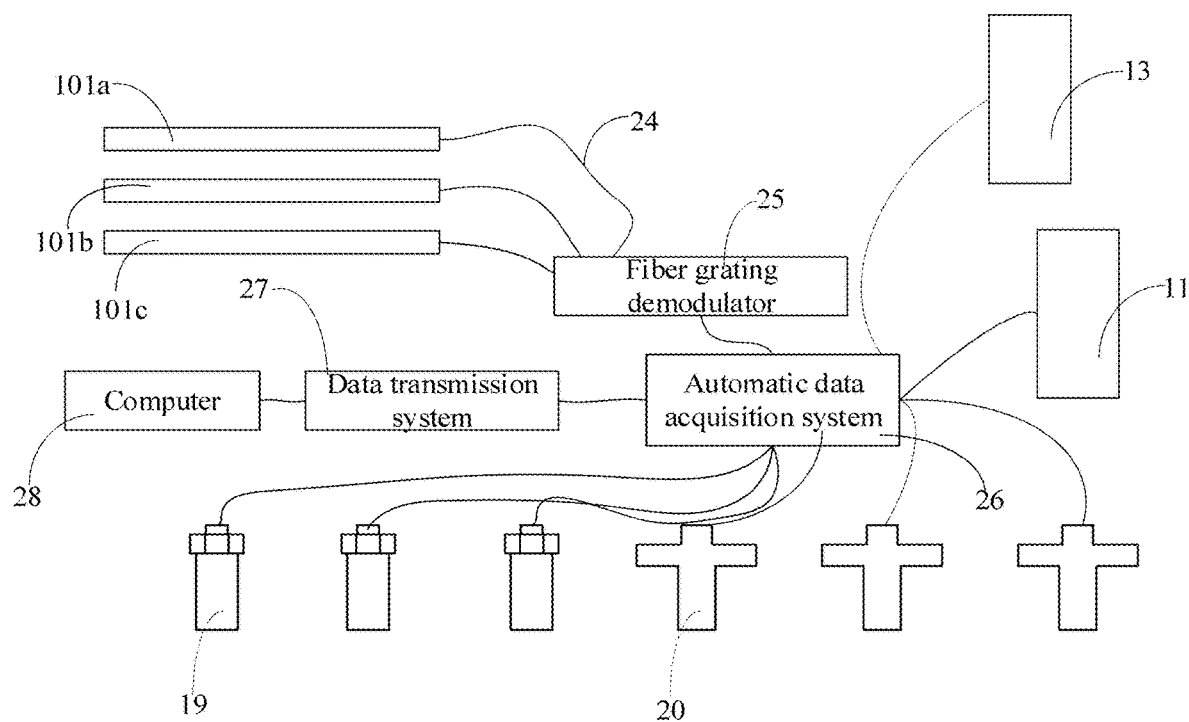
FIG. 11 is a schematic diagram of a data acquisition module.

With reference to FIG. 11, the data acquisition module mainly includes a fiber grating demodulator 25, an automatic data acquisition system 26, a data transmission system 27 and a computer 28 which are connected in sequence, where the fiber grating demodulator 25 is connected to the grating array temperature sensing optical cable 101a, the grating array stress sensing optical cable 101b and the grating array vibration sensing optical cable 101c in each of the BFRPs 101 by a fixed connection (FC)/physical contact (PC) patch cable 24, and the FC/PC patch cable 24 is led into the first steel casing pipe 2 along the steel strand 4 to be connected to the grating array temperature sensing optical cable 101a, the grating array stress sensing optical cable 101b and the grating array vibration sensing optical cable 101c. The data transmission system 27 may automatically transmit the internal temperature, stress and vibration state of each of the BFRPs 101 to the computer 27 in real time, so as to automatically monitor a basalt fiber anchor cable tensioning process.

Moreover, the automatic data acquisition system 26 is further connected to the pressure sensor 13, an oil pump of the center hole jack 11, the stay wire type displacement meter 18, the temperature sensor 19 and the humidity sensor 20 for acquiring the load value of the basalt fiber anchor cable, oil pressure of the center hole jack 11, the relative elongation of the basalt fiber anchor cable, the compression deformation of the reaction frame 6, and the temperature and humidity in the reaction frame 6.

Moreover, with reference to FIGS. 1 and 2, on the basis of the integral tension test system for a large-tonnage basalt fiber anchor cable, the embodiment of the present disclosure provides a test method for the integral tension test system for a large-tonnage basalt fiber anchor cable. The test method mainly includes:

Temperature and humidity in the reaction frame 6 are adjusted: the internal temperature of the reaction frame 6 may be kept at constant temperature required by an antiseismic test for a long time by adjusting power of a heating pipe 702 or a low-temperature condensation pipe 701; and the internal humidity of the reaction frame 6 is always kept at constant humidity required by the anti-seismic test by adjusting a gear of a humidifying and dehumidifying machine 21.

Vibration is applied to the reaction frame 6 by the vibration table 5: a seismic wave waveform is imported into the vibration table 5, to control the vibration table 5 to input vibration with a specific waveform to the reaction frame 6.

Tension is applies to the entire basalt fiber anchor cable by the center hole jack 11, and meanwhile, temperature, stress and vibration in each BFRP 101 of all BFRP bundles 1 are acquired by the data acquisition module until the basalt fiber anchor cable is damaged.

Before tension is applied to the basalt fiber anchor cable, the basalt fiber anchoring bars are tensioned one by one by a small-tonnage center hole jack until the basalt fiber anchoring bars are tensioned to a pre-tensioning design value, and when stress of the basalt fiber anchoring bars is basically consistent, the center hole jack 11 is used for entire tensioning, so as to prevent eccentric load caused by stress of the basalt fiber anchor cable structure.

When the integral tension test system for a large-tonnage basalt fiber anchor cable is used for an anchor cable ultimate strength test, a loading mode of the center hole jack 11 is that the center hole jack 11 applies tension to the basalt fiber anchor cable step by step by taking 5% of designed load as a gradient. During load applying, a size of the applied load is collected uninterruptedly by an oil pump of the center hole jack 11 and a pressure sensor until the entire basalt fiber anchor cable is damaged.

Moreover, when the integral tension test system for a large-tonnage basalt fiber anchor cable is used for an anchor cable creep test, the internal temperature of the reaction frame 6 may be kept at constant temperature required by the creep test for a long time by adjusting power of a heating pipe 702 or a low-temperature condensation pipe 701; and meanwhile, the internal humidity of the reaction frame 6 is always kept at constant humidity required by the creep test by adjusting a gear of a humidifying and dehumidifying machine 21. Moreover, the center hole jack 11 is controlled to apply a certain load and then lock or keep the load at a constant load value, and stress loss and a creep feature of the large-tonnage basalt fiber anchor cable under specific temperature and humidity conditions are known by uninterruptedly monitoring stress and temperature in the BFRP 101 for a long time.

Herein, the involved terms including front, rear, upper, lower, etc., are defined in terms of the positions of parts and between the parts in the drawings, just for clarity and convenience of expressing the technical solution. It should be understood that the use of such parties should not limit the scope of protection of the claimed application.

The above embodiments and the features of the embodiments herein may be combined with each other without conflict.

The above embodiment is merely a preferred embodiment of the present disclosure but not intended to limit the present disclosure, and any modifications, equivalent replacements, improvements, etc. made within the spirit and principles of the present disclosure should be comprised within the scope of protection of the present disclosure.

What is claimed is:

1. An integral tension test system for a large-tonnage basalt fiber anchor cable, comprising:
    a plurality of basalt fiber anchoring bars, wherein each of the plurality of basalt fiber anchoring bars comprises a basalt fiber reinforced plastic (BFRP) bundle, a steel strand, a first steel casing pipe with two ends bonded to one end of the BFRP bundle and the steel strand respectively, and a second steel casing pipe bonded to the other end of the BFRP bundle, the BFRP bundle and the steel strand are centered in the first steel casing pipe, the BFRP bundle comprises a plurality of BFRPs which are bound and combined, and a grating array temperature sensing optical cable, a grating array stress sensing optical cable and a grating array vibration sensing optical cable are bonded in each of the BFRPs;

a vibration table and a reaction frame arranged on the vibration table, wherein the reaction frame is of a closed structure, all the basalt fiber anchoring bars penetrate the reaction frame, the first steel casing pipe of each of the plurality of basalt fiber anchoring bars is located in the reaction frame, the steel strand penetrates one end of the reaction frame and a center hole jack, and the second steel casing pipe of each of the plurality of basalt fiber anchoring bars is located outside the reaction frame to be anchored; and a data acquisition module connected to all grating array temperature sensing optical cables, all grating array stress sensing optical cables and all grating array vibration sensing optical cables, so as to acquire temperature, stress and vibration of each of the BFRPs.

2. The integral tension test system according to claim 1, further comprising a high-low temperature alternating changer for heating and cooling an interior of the reaction frame, wherein a plurality of temperature sensors are further arranged in the reaction frame, and all temperature sensors are connected to the data acquisition module.

3. The integral tension test system according to claim 1, further comprising a humidifying and dehumidifying machine in communication with the reaction frame, wherein a plurality of humidity sensors are further arranged in the reaction frame, and all humidity sensors are connected to the data acquisition module.

4. The integral tension test system according to claim 1, wherein a first base plate, a pressure sensor, a second base plate, a first anchor ring, a limiting plate and a second anchor ring are sequentially arranged on an outer side of one end, close to the first steel casing pipe, of the reaction frame, the center hole jack is arranged between the limiting plate and the second anchor ring, the steel strand penetrates the first base plate, the pressure sensor, the second base plate, the first anchor ring, the limiting plate, the center hole jack and the second anchor ring, and the pressure sensor and an oil pump of the center hole jack are connected to the data acquisition module.

5. The integral tension test system according to claim 4, wherein a plurality of anchor holes are provided in both the first anchor ring and the second anchor ring, each steel strand penetrates one anchor hole, two conical clips surrounding the steel strand are arranged in the anchor hole, and the steel strand is clamped by the two clips.

6. The integral tension test system according to claim 1, wherein a stay wire type displacement meter is arranged between the center hole jack and one end, close to the first steel casing pipe, of the reaction frame, a stay wire of the stay wire type displacement meter is parallel to an axis of the center hole jack, two ends of the reaction frame are provided with another stay wire type displacement meter, stay wires of the two stay wire type displacement meters are parallel to each other, and the two stay wire type displacement meters are connected to the data acquisition module.

7. The integral tension test system according to claim 1, wherein a pressure bearing plate and a pressure bearing anchor ring are sequentially arranged on an outer side of one end, close to the second steel casing pipe, of the reaction frame, a plurality of through holes are provided in the pressure bearing plate, a plurality of stepped through holes are provided in the pressure bearing anchor ring, each second steel casing pipe is inserted into one stepped through hole and abuts against the stepped through hole, and the BFRP bundle penetrates the through hole and the stepped through hole.

8. The integral tension test system according to claim 1, wherein surfaces of portions of bonding the BFRP to the first steel casing pipe and the second steel casing pipe are subjected to sand blasting treatment, a surface of a portion of bonding the steel strand to the first steel casing pipe are subjected to nicking treatment, and internal threads are arranged on inner walls of the first steel casing pipe and the second steel casing pipe.

9. A test method for the integral tension test system according to claim 1, comprising:

adjusting temperature and humidity in the reaction frame;

applying vibration to the reaction frame by the vibration table; and tensioning the basalt fiber anchoring bars one by one by a small-tonnage center hole jack, applying, after the basalt fiber anchoring bars are tensioned to a pre-tensioning design value, tension to an entire basalt fiber anchor cable by the center hole jack, and acquiring temperature, stress and vibration in each BFRP of all the basalt fiber anchoring bars by the data acquisition module until the entire large-tonnage basalt fiber anchor cable is damaged.

* * * * *